(12) United States Patent
Vogley et al.

(10) Patent No.: US 7,925,166 B2
(45) Date of Patent: Apr. 12, 2011

(54) METHOD AND APPARATUS FOR PHOSTONIC STACK SYSTEM FOR VEHICLE CONTROL/SENSE

(76) Inventors: Wilbur C. Vogley, Cranberry Township, PA (US); Paul Stoner, Powell, OH (US)

(*) Notice: Subject to any disclaimer, the term of this patent is extended or adjusted under 35 U.S.C. 154(b) by 803 days.

(21) Appl. No.: 11/647,828

(22) Filed: Dec. 28, 2006

(65) Prior Publication Data

US 2008/0019698 A1 Jan. 24, 2008

Related U.S. Application Data

(60) Provisional application No. 60/831,996, filed on Jul. 19, 2006.

(51) Int. Cl.
*H04B 10/00* (2006.01)

(52) U.S. Cl. .......... 398/113; 398/59; 398/141; 398/135; 398/60; 385/89; 385/90; 385/92; 385/93; 725/74; 701/48; 701/29; 701/33; 701/32; 700/302

(58) Field of Classification Search ............ 398/58, 398/59, 60, 135, 100, 66, 67, 68, 63, 113, 398/107, 141, 164, 165, 167.5, 138, 139; 701/48, 29, 33, 32; 725/74; 385/89, 90, 92; 700/302

See application file for complete search history.

(56) References Cited

U.S. PATENT DOCUMENTS

| 5,040,168 | A  | * | 8/1991  | Maue et al. ................... 398/43 |
| 6,643,465 | B1 | * | 11/2003 | Bosinger et al. ............... 398/59 |
| 7,463,832 | B2 | * | 12/2008 | Weaver ........................ 398/196 |
| 2003/0072053 | A1 | * | 4/2003 | Weaver et al. ................ 359/124 |
| 2006/0062573 | A1 | * | 3/2006 | Uchida et al. ................... 398/5 |
| 2006/0067697 | A1 | * | 3/2006 | Aizpuru ...................... 398/135 |

* cited by examiner

*Primary Examiner* — Hanh Phan
(74) *Attorney, Agent, or Firm* — Ansel M. Schwartz (57) ABSTRACT

An avionics system for a plane includes a plurality of nodes disposed throughout the plane, each node performing a function. The system includes an optical network in communication with the nodes and through which the nodes communicate. The system includes at least one of the nodes having a hardwired interpreter that interprets the information transmitted from another one of the nodes via the optical network. A method for operating a plane includes the steps of communicating information through an optical network between a plurality of nodes disposed throughout the plane, each node performing a function. There is the step of interpreting with at least one of the nodes having a hardwired interpreter the information transmitted from another one of the nodes via the optical network. A phostonic stack.

9 Claims, 8 Drawing Sheets

METHOD AND APPARATUS FOR PHOSTONIC STACK SYSTEM FOR VEHICLE CONTROL/SENSE

This application claims the benefit of U.S. Provisional Application No. 60/831,996 filed Jul. 19, 2006.

FIELD OF THE INVENTION

The present invention is related to the operation of a vehicle having an optical network through which nodes that perform a function communicate. More specifically, the present invention is related to the operation of a vehicle having an optical network through which nodes that perform a function communicate where at least one of the nodes is a hardwired interpreter.

BACKGROUND OF THE INVENTION

Currently, the sensors and control of vehicles are mechanical links or electrical wires. They may also be systems with microprocessors and software to determine sensor input, relate the input, interpret the sensors for mean, min, and max for those sensors in order to give readings and warnings. It uses the same technology to issue commands and control to the vehicle. Some of these electrical links are analog information and yet other links are defined bus or interface architectures. Many times, one must go through several adapters to connect the correct information.

BRIEF SUMMARY OF THE INVENTION

The present invention pertains to an avionics system for a plane. The system comprises a plurality of nodes disposed throughout the plane, each node performing a function. The system comprises an optical network in communication with the nodes and through which the nodes communicate. The system comprises at least one of the nodes having a hardwired interpreter that interprets the information transmitted from another one of the nodes via the optical network.

The present invention pertains to a method for operating a plane. The method comprises the steps of communicating information through an optical network between a plurality of nodes disposed throughout the plane, each node performing a function. There is the step of interpreting with at least one of the nodes having a hardwired interpreter the information transmitted from another one of the nodes via the optical network.

The present invention pertains to a phostonic stack interface system to a network. The stack comprises an FPGA. The stack comprises a Faraday cage, a driver for transferring information to the network, a photo sensor to receive information from the network, a connector for communication to the network, and a power source to power the FPGA.

The present invention replaces current technology with a unique system that communicates through the entire vehicle's field replaceable units (FRUs). This is done through unique chip-to-chip optical links. This lightens the equipment by eliminating devices and boxes as well as increase security and removes vulnerability through photonics versus electrical interfaces. The information is replicated in a unique method of memory address links that are in update mode at all times.

Current technology uses an electrical interface or mechanical link to relay information about the vehicle as well as control the vehicle. The current technology may include a microprocessor, mechanical, and/or electrical linked system. Most vehicles have a CPU that controls fuel mixtures, and monitors conditions to determine correct engine operation as well as provide warning information.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
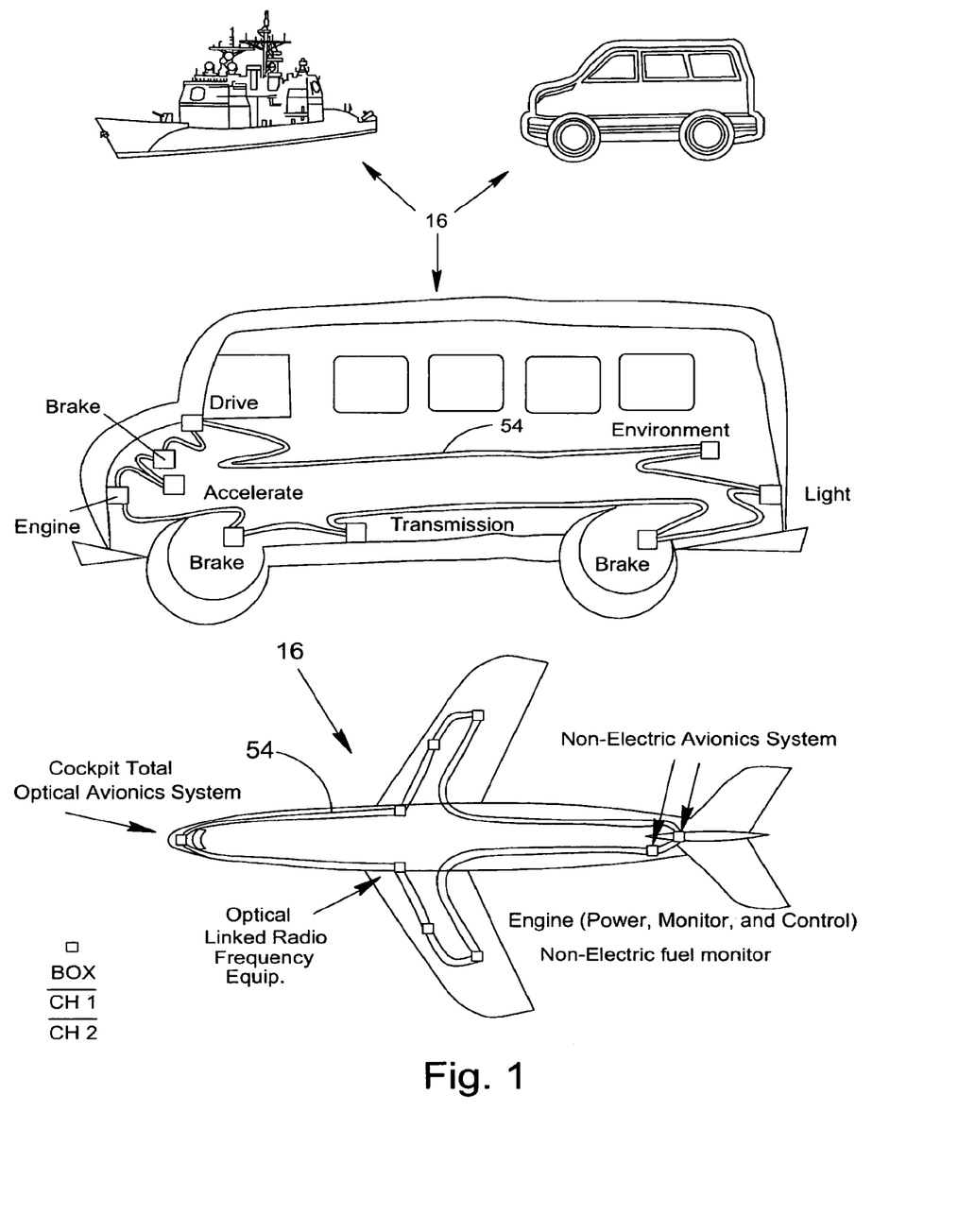
FIG. 1 shows various vehicles which utilize the system of the present invention.

Referring now to the drawings wherein like reference numerals refer to similar or identical parts throughout the several views, and more specifically to FIG. 1 thereof, there is shown a control system 50 for a vehicle 16. The system 50 comprises a plurality of nodes 52 disposed throughout the vehicle 16, each node performing a function. The system 50 comprises an optical network 54 in communication with the nodes 52 and through which the nodes 52 communicate. The system 50 comprises at least one of the nodes 52 having a hardwired interpreter 56 that interprets the information transmitted from another one of the nodes 52 via the optical network 54.

Preferably, the hardwired interpreter 56 includes a dedicated circuit within a chip. The hardwired interpreter 56 preferably has no software. Preferably, the interpreter has no software. The interpreter preferably includes a local link to another one of the nodes associated with the hardwired interpreter. The hardwired interpreter preferably includes a link control in communication with the other nodes of the plurality of nodes. Preferably, at least one of the other nodes is a sensor. The vehicle is either a car, truck, bus, plane, train or boat and may be manned or unmanned.

The present invention pertains to a method for operating a vehicle 16. The method comprises the steps of communicating information through an optical network 54 between a plurality of nodes 52 disposed throughout the vehicle 16, each node performing a function. There is the step of interpreting with at least one of the nodes 52 having a hardwired interpreter 56 the information transmitted from another one of the nodes 52 via the optical network 54.

The present invention pertains to a phostonic stack 58 interface system 50 to a network 54. The stack 58 comprises an FPGA 74. The stack 58 comprises a Faraday cage 76, a driver 78 for transferring information to the network 54, a photo sensor to receive information from the network 54, a connector for communication to the network, and a power source 80 to power the FPGA 74.

In the past, control systems, such as in aircraft, were cables, hydraulics, and analog gauges to sensors for things like oil pressure, engine RPM, altitude, etc. As electronic circuits developed, the electronics moved into the aircraft a little at a time with radios, electric tachometers, and now fly-by-wire. Computers control nearly all information transferred within an aircraft. New challenges have come forward, such as lightning and aggressive disruptive electronic noise generation.

This invention replaces the existing cables with a plastic optical fiber that connects all the systems in a vehicle 16, such as an aircraft. In the process of developing the optical links, the processor has been eliminated and its latency by implementing hardwired state machines to do all of the control and monitor task done by processors previously.

The innovation of the phostonic stack 58 vehicle 16 control system 50 is:

1) Eliminating the control harness.
2) Eliminating complex control interface.
3) Eliminate multiple adapters between standards.
4) Adding speed and reliability.
5) Linking sensors, control, and feedback with predetermined allocated space.
6) Introducing the single device "floating" Faraday cage 76 for integrity.
7) Eliminating mechanical linkages in many instances.
8) Reduction in overall maintenance cost.

This system 50 is based on taking the control interface and reducing the possible commands to a series of memory locations that are simultaneously updated at ~1000 times a second throughout the vehicle 16. The updates can be targeted to those units with a need to know, or update all of the units on the link.

Figure 2A:
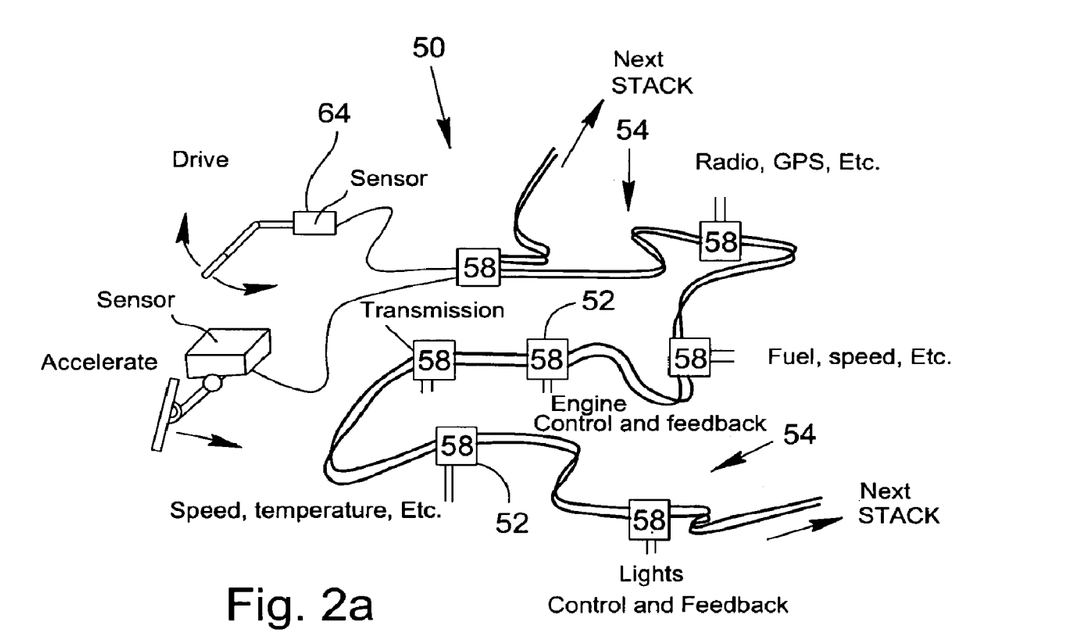
FIG. 2a shows a system of the present invention utilized with a drive control and accelerator.
Figure 2B:
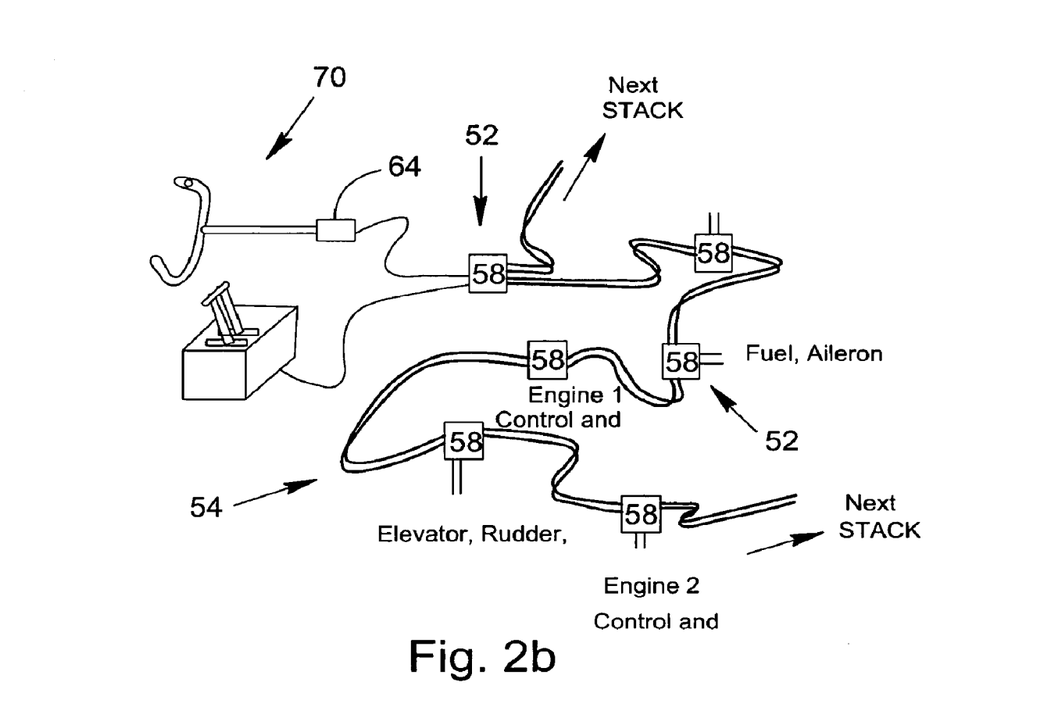
FIG. 2b shows the system of the present invention utilized with a control wheel and throttle.
Figure 3:
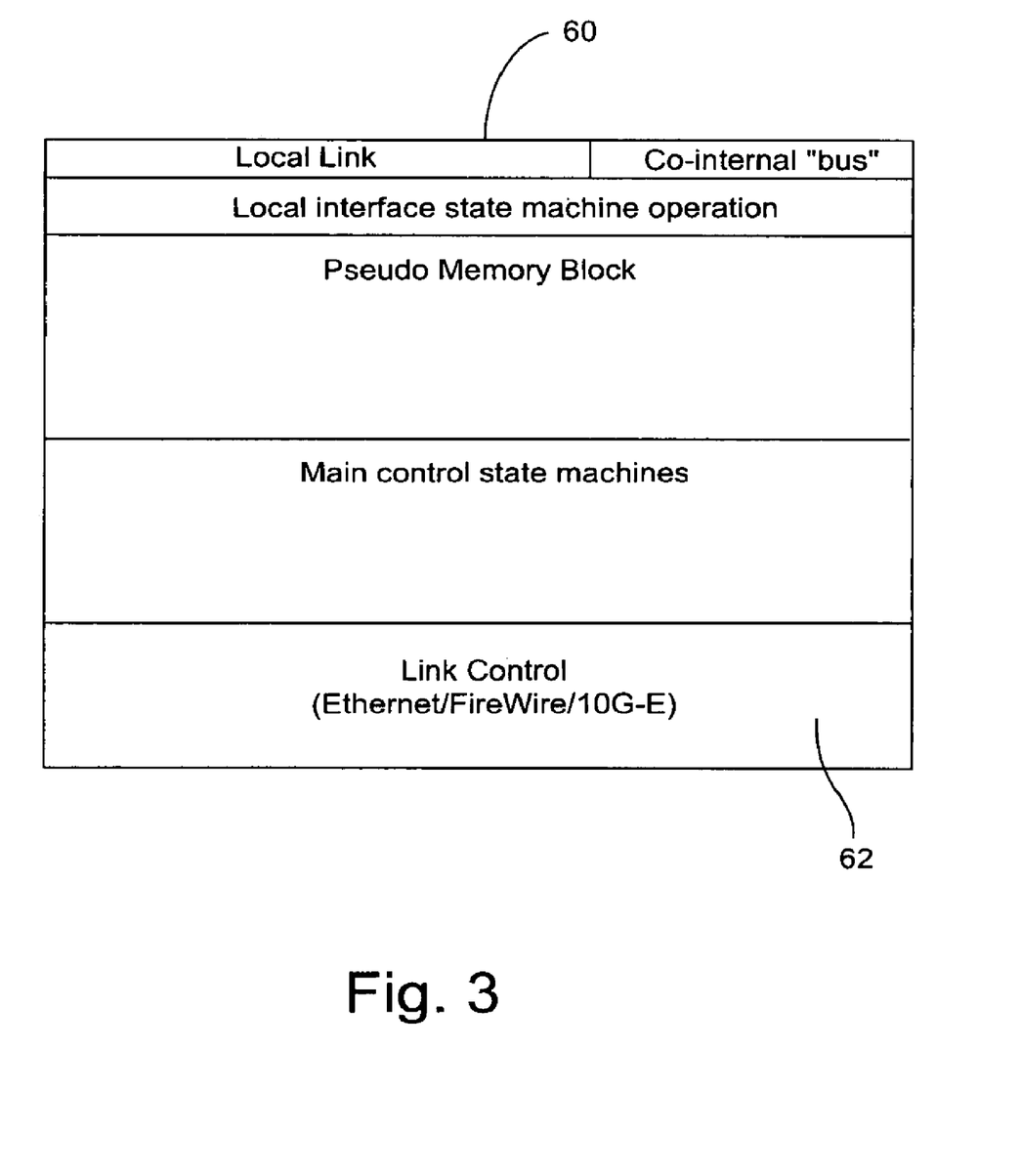
FIG. 3 is a block diagram of a hardwired interpreter of the present invention.

See FIG. 1. It demonstrates the link between hardware, controls, and sensors 64. FIGS. 2*a* and 2*b* show the links are coherent. FIG. 3 demonstrates a typical device layout using a Xilinx FPGA 74 that can be made into an ASIC.

In FIG. 2*a*, the sensors 64 for the drive control and the accelerator alter the memory at the sending end, the information is sent to the other SCs on the link, and the units at those locations look at the memory address assigned to them and receive the updates.

In FIG. 2*b,* the sensors 64 for the drive control and the accelerator alter the memory at the sending end, the information is sent to the other SCs on the link, and the units at those locations look at the memory address assigned to them and receive the updates.

FIG. 3 is a representation of the Software-Less System with a visual sensation of the allocation on the device for its various components. This is merely a pictorial and may have no relationship to actual locations.

Using the FPGA 74/ASIC in FIG. 3 eliminates the need for an operating system and microprocessor. The functions of the microprocessor are replicated in the ASIC VIA hardwired logic to perform the necessary functions. All of the necessary information can be incorporated on a single device, including both the local and link interface.

In FIG. 3, the local link 60 referred to at the top of the block is the Mimic Memory interface to whatever device actually being talked with as opposed to the link control 62 which is the interface used to get data between this device and the other equipment on the vehicle 16. An example of this interface is FireWire, IP, AFDX, etc. Any of these interface protocols can be used. Data is then sent on an internal bus to location either set in the device by default or by a state machine direction.

Many of the current systems know where they are by the plug at the location. The optical system 50 here can be operated in a similar fashion. The location can be either code by a mechanical indicator such as a plug extension location on the surface provided of the "box" or by an optical sensor 64 on the device that reads a code for the location, or identifies an extrusion and its position to the connector.

The hardwired phostonic stack 58 system 50 is much faster as there is no instruction load time and no lookup time involved in its operation.

Once a command is given with a microprocessor, if it is not in the subroutines for the request, it must acquire the program or subroutine, execute it, and then issue the commands. This can take many, many clock cycles. With hardwired logic, it can only take as long as the longest state sequence in this phostonic stack 58 solution.

Control has more information to cover urgency and priority of the request and its interpretation. These can all be managed by the phostonic stack 58 solution, and updated through the IOI optical links.

The local link 60 referred to at the top of the block is the Mimic Memory interface to the unit at this location. This "link" is defined by the unit and may be from 1 to 128 bits wide. The link will be designed for the unit or be logically assigned by the local interface state machine.

If it is designed for a specific unit, the information received from the unit will be directly mapped to a local memory location. The information to the unit will be sent directly from a memory location defined by the specific detail for the unit attached.

If the unit is a logic assignment, the local interface state machine is implemented. It can determine the unit by a code submitted from the unit at power up, a keyed local bus plug, an enquiry from the state machine, an assignment from another node, etc. It will then assign a memory location to link to for both to and from the unit.

This information to and from the memory locations reside in the Pseudo-Memory Block. It is named pseudo-memory block as it may be memory, or temporary logic storage.

The main control state-machines have the function to do the operations that were preformed by the obsolete software and processors of the older systems. They take the information off the link control 62 and put it in the correct local pseudo memory locations as well as take information from the local memory and give it to the link control 62 for forwarding to the correct node. The main control is much faster than a processor for two reasons, 1) there are no software cycles involved, and 2) there is virtually no limit on the number of process being acted on in a true parallel fashion.

The link control 62 sends and receives information off the node links. The node links are links between nodes 52, and at this time are current standards such as Ethernet/FireWire/10G-E/AFDX. While these are current, it does not exclude future links, some of which may be proprietary. The linked system 50 has its own buffer and repeater system to transfer current input to the output for doing its own add/drop function as well as handling priority injection for emergencies.

Many of the current systems know where they are by the plug at the location. The present invention can be operated in a similar fashion. The location can be either code by a mechanical indicator such as a plug extension location on the surface provided of the "box" or by an optical sensor 64 on the device that reads a code for the location, or identifies an extrusion and it position to the connector. If it is to be routed by a state-machine, it will get the location from the incoming data stream by doing a compare to see which locations in the "memory" the information should reside. This would be the case for nodes 52 serving more than one local entity.

Operation:

The operation will be similar for all sensors and commands even though the sensors will vary in type and style. The system 50 will accommodate legacy equipment and sensors as well as drive legacy motors and actuators. This includes, but not limited to, Engine Control, Engine Monitors, Fuel Level, Fuel Tank Switching, Brake Control, Dash Lighting, Lights, Radio Links, Onboard Audio/Video Systems, and GPS, just to name a few.

As an example, a command from the brake pedal 66 to the brakes will be followed.

Figure 4A:
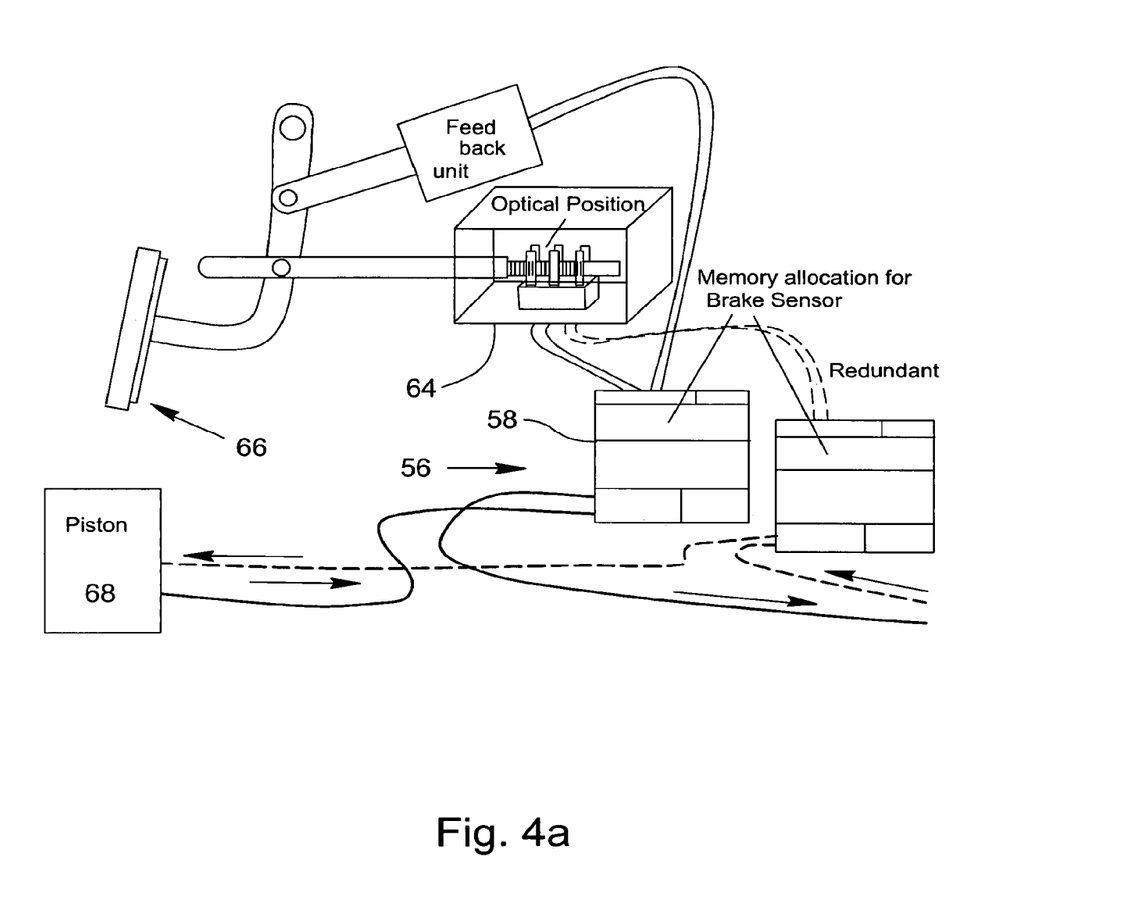
FIG. 4a shows a portion of the system of the present invention utilized with a brake pedal.

In FIG. 4a, the brake pedal 66 may be pushed to engage brakes. The sensor 64 determines where the brake pedal 66 is located by the optical sensors. It is given to the phostonic stack 58 module in terms of 100s or 1000ths of increment movement. It is monitored similar to the measurements taken in a micrometer or vernier caliper, with the exception in this example, it is measured by optical refraction on the extension of the brake pedal 66 shaft.

When the shaft is moved, the digital number is sent to the phostonic stack 58 module. The phostonic stack 58 module is aware of the sending device by the location of the connection on the bus and the type of sensor/device. One method of defining the type of sensor/device is to ground/short a combination of pins for the location. For example, pin 1 and 5 of the 6 pin ID block that is the first 6 pins of the connector. Pins 12, 13, 14, 15, 16 could be input to the phostonic stack 58 module from the brake pedal 66 sensor at the brake pedal 66.

The state machine in the SC is set to modify the locations in memory by the ID block and locations of the data pins coming in. It will modify the locations at 7000 through 7FFF.

The state machine in the Link Drive loop is directed to put the data from location 7000 to 7FFF on the link line to all the modules on the link.

Figure 5A:
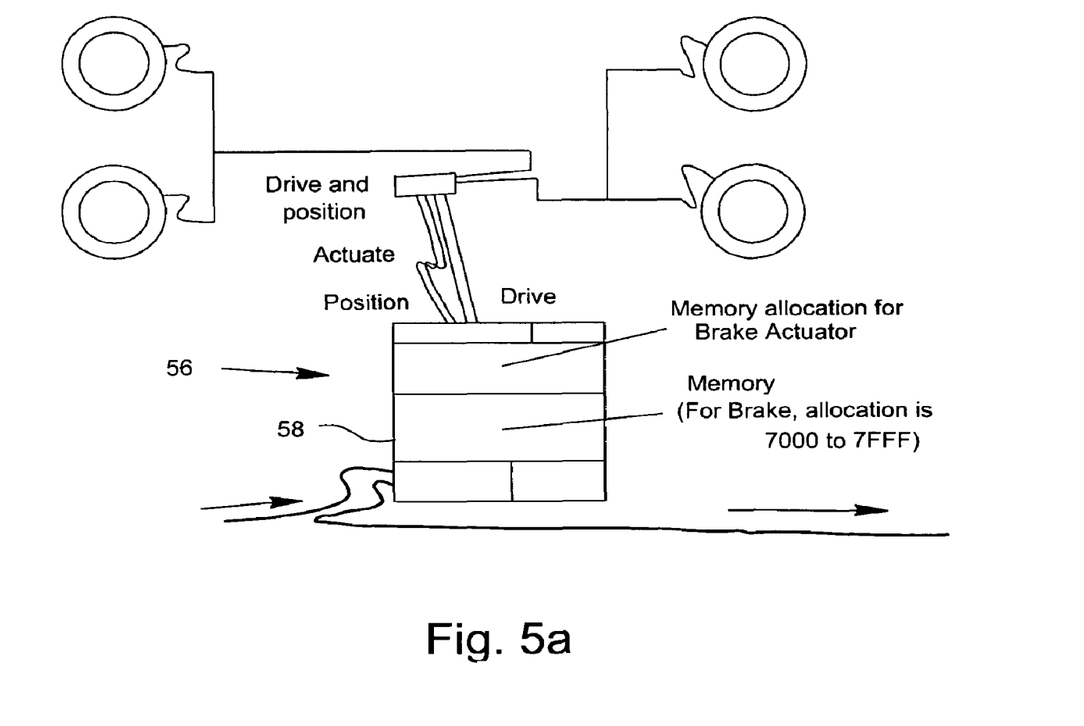
FIG. 5a shows a portion of the system of the present invention utilized with a brake actuator.

The module in FIG. 5 has loaded the data in its addresses 7000 to 7FFF. The local bus state machine's memory loaded bit is set and it reads the memory location and sends the data to the actuator as well as verifies the feedback of the physical location of the brake actuator.

The brake pistons 68 are moved appropriately. They in turn send a feedback signal to the back pressure unit on the brake pedal 66 arm, thus giving the impression the pedal is actually pushing a mechanical linked brake pedal 66. This is accomplished through a small cylinder with hydraulic fluid and a tiny control valve between chambers.

Figure 7:
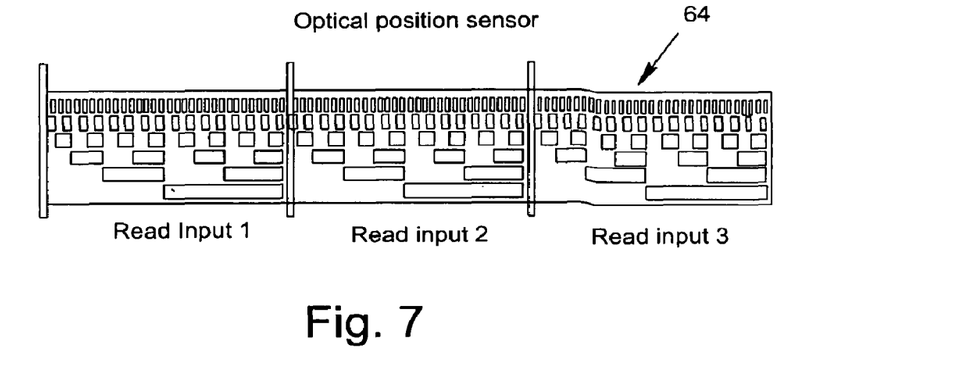
FIG. 7 shows an optical position sensor.

One method of the sensor 64 in FIG. 4a is to use a hole or reflectors in the shaft of the break pedal with optical drive and pickup for the sensor 64 operation. The holes or reflectors are located in such a fashion as shown in FIG. 7. There is a total count of 128 positions in this example. The presentation demonstrates triple redundancy for safety in commercial vehicles.

As the reflector/hole plate travels horizontally, the light/sensor post determines how many of the 6 vertical positions "see" light and relates that information to the correct memory locations.

The information is saved here in FIG. 5a from the sensors 64 in FIG. 4a to locations in the area for brake pressure/position. This is done through storing the information in the proper location in this section as specified in the manual for this vehicle 16. As this becomes practice, there may be an ideal location and increment for all vehicles. Location feedback may be handled by the same method as the brake sensor 64.

In another example, a command from the yoke 70 to the elevator 72 in a plane is followed.

Figure 4B:
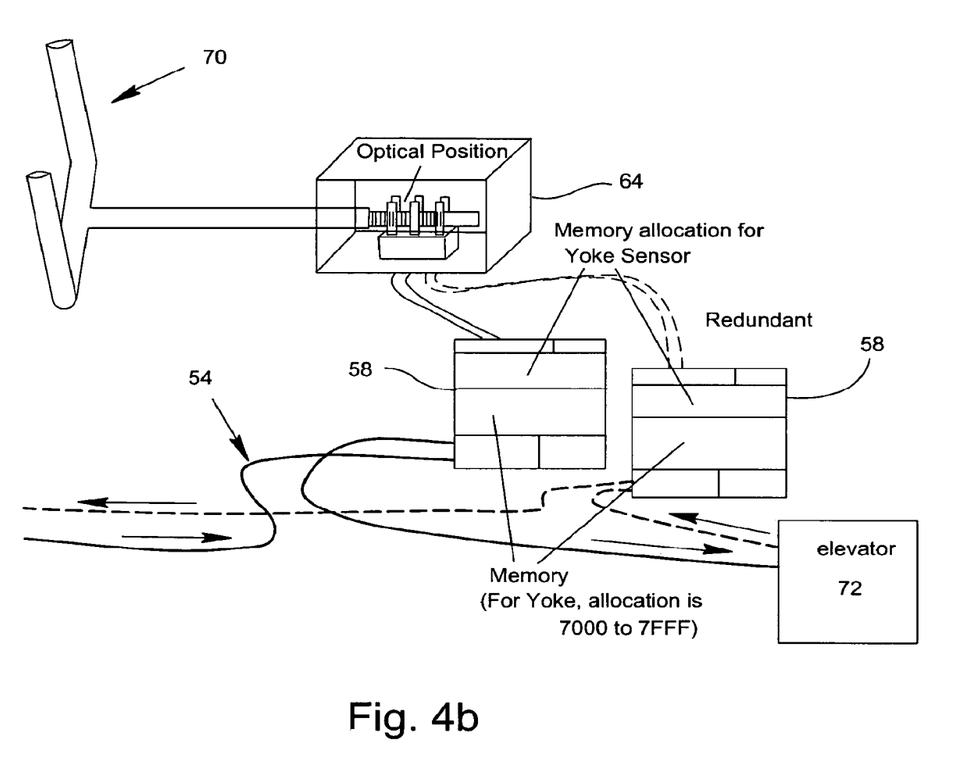
FIG. 4b shows a portion of the system of the present invention utilized with a yoke.

In FIG. 4b, the yoke 70 may be moved to the right or left to change the elevator 72. The sensor 64 determines where the yoke 70 is located by the optical sensors. It is given to the phostonic stack 58 module in terms of 100s or 1000ths of increment movement. It is monitored similar to the measurements taken in a micrometer or vernier caliper, with the exception in this example, it is measured by optical refraction on the extension of the yoke 70 shaft.

When the shaft is moved, the digital number is sent to the phostonic stack 58 module. The phostonic stack 58 module is aware of the sending device by the location of the connection on the bus and the type of sensor/device. The type of sensor/device is grounded pin 1 and 5 of the 6 pin ID block that is the first 6 pins of the connector. Pins 12, 13, 14, 15, 16, and 17 are the input to the phostonic stack 58 module from the elevator 72 sensor 64 at the yoke 70.

The state machine in the SC is set to modify the locations in memory by the ID block and locations of the data pins coming in. It will modify the locations at 7000 through 7FFF.

The state machine in the Link Drive loop is directed to put the data from location 7000 to 7FFF on the link line to all the modules on the link.

One method of the sensor 64 in FIG. 4b is to use a hole or reflectors in the shaft of the break pedal with optical drive and pickup for the sensor 64 operation. The holes or reflectors are located in such a fashion as shown in FIG. 7. There is a total count of 128 positions in this example. The presentation demonstrates triple redundancy for safety in commercial vehicles.

As the reflector/hole plate travels horizontally, the light/sensor post determines how many of the 6 vertical positions "see" light and relates that information to the correct memory locations.

The module in FIG. 5a has loaded the data in its addresses 7000 to 7FFF. The local bus state machine's memory loaded bit is set and it reads the memory location and sends the data to the actuator as well as verify the feedback of the physical location of the elevator 72 actuator.

The elevator 72 is moved appropriately.

Figure 5B:
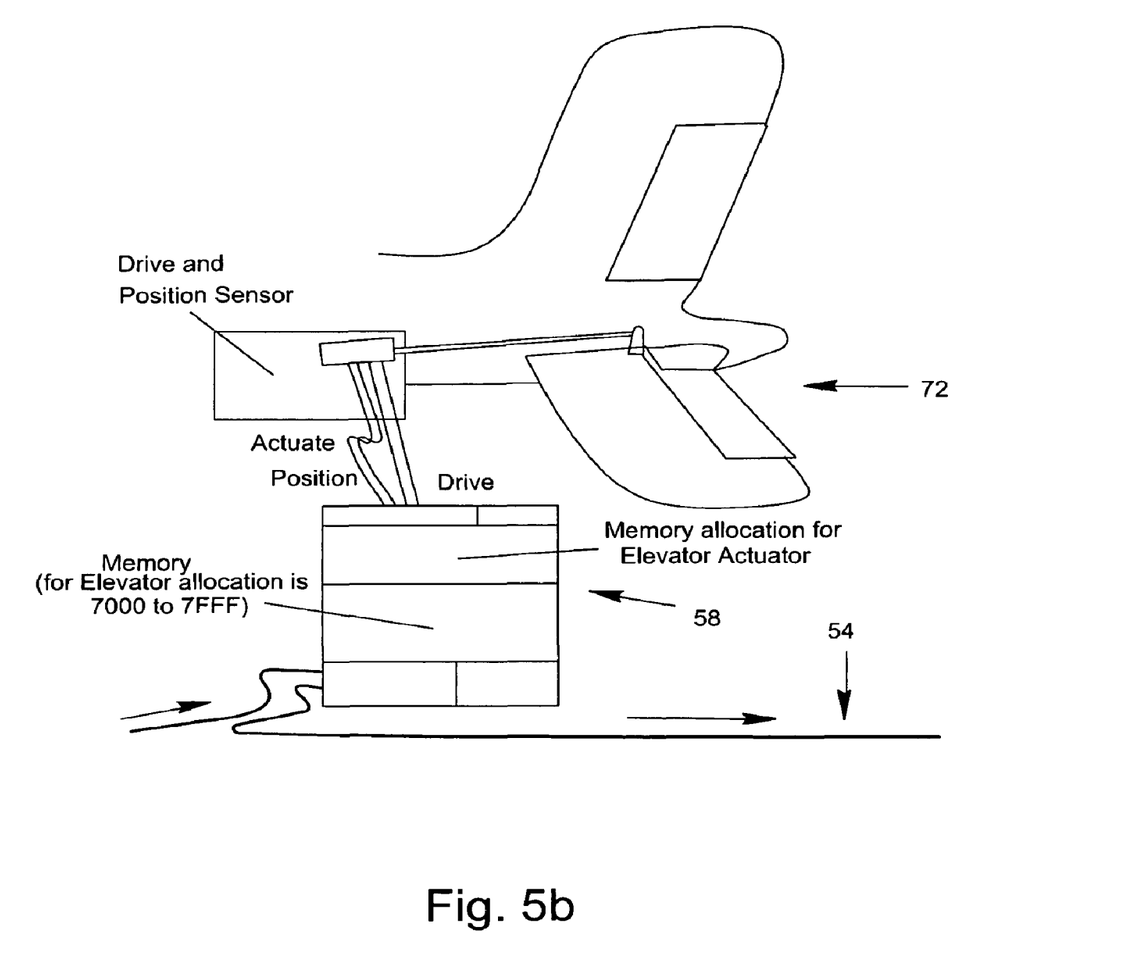
FIG. 5b shows a portion of the system of the present invention utilized with an elevator actuator.

The information is saved here in FIG. 5b from the sensors 64 in FIG. 4b to locations in the area for brake pressure/position. This is done through storing the information in the proper location in this section as specified in the manual for this vehicle 16. As this becomes practice, there may be an ideal location and increment for all vehicles. Location feedback may be handled by the same method as the brake sensor 64.

In another example, take the action of a turn signal:

For this example, assign the memory locations of 7000 to 7000F for the right turn signal and 70F0 for the left turn signal. This allows for a 16 bit word to command the turn signal. Depending on the desired command, it could be from "ON" to "ON with a timer", etc. At this point, assume only turn on and turn off. Indicating a right turn through deflecting the turn signal lever or even a finger gesture for a right hand turn will change the local module that it is time to turn on the right turn signal. The actual signal from the actuator will set a local bit at 7001 to "ON". The device senses this "memory change, reads the control device memory locations to the interface, and transfers 16 bits to the other memory devices on the network 54. The only receivers that will use these locations will be the turn indicators in each of the four corners of the car. These memory locations will sort the new information and look at those locations to determine what to do. The front and rear external indicators will implement "ON" function as well as change the memory location at 7010 to a "1" to indicate the signal is on. If the signal cannot come on due to a failure of some type, it will send an additional bit (7011) to indicate it had received the command, but there is trouble and rapidly flash the signal location at the instrument panel as well as record the information to the system memory for read out at a garage.

Figure 8:
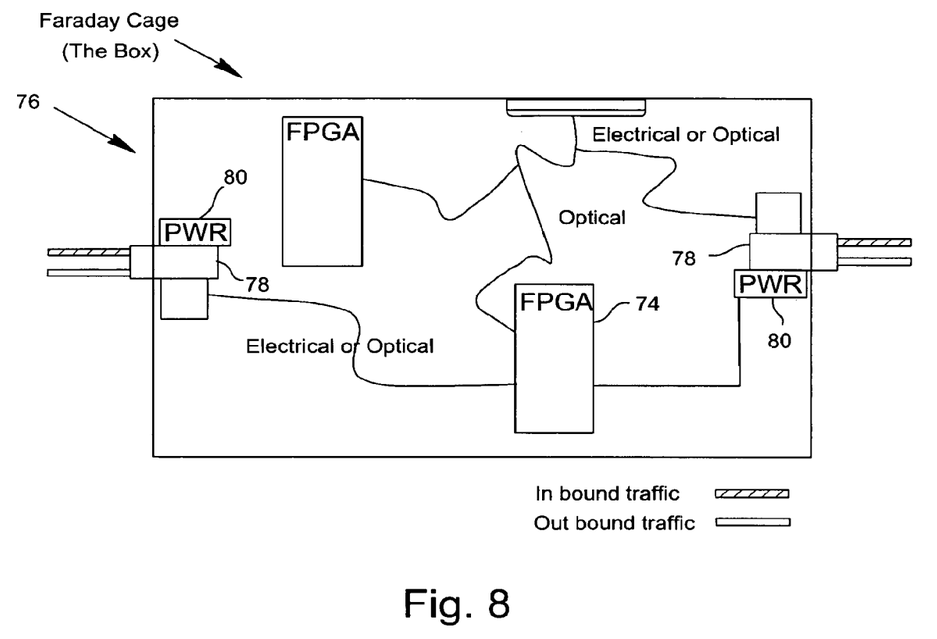
FIG. 8 shows a Faraday cage.

The Phostonic Stack 58 interface system 50 comprises at least one PLD or FPGA 74, a grounded or floating Faraday cage 76, at least one laser driver 78 and at least one photo sensor (PIN), a connector(s), and at least one photocell sheet. The PLD or FPGA 74 contains the logic and state-machines to do the determinations, for sending and receiving information to both the network 54 and to the local unit. The Faraday cage 76 prevents erroneous electrical noise from entering or leaving the internal circuits. The laser driver(s) 78 transfer information form the local unit to the network 54, and possibly to the local unit as well. The photo sensor(s) receive information generated by another node on the network 54 and passed to this node via the network 54 and generate an electrical pulse to be handled by the PLD or FPGA 74. The connector(s) contain the optical link to and from the network 54, as well as to and from the unit which can also be optical. The photocell sheet contains a number of photocells to supply the PLD/FPGA 74 and lasers with enough power to function with a surplus to charge a storage device such as a super cap that is designed to handle any interment shortcomings of the power source 80. The number of photocells tied in series is defined by the voltage needed by the devices; the number of series blocks in parallel is determined by the amount of power required by the devices at this location.

There may be redundant FPGAs 74 as dictated by the governing agency such as the DOT for land vehicles, Coast Guard for seaworthy craft, or FAA for aircraft. The one encompassed here is a full duplex switched Ethernet, a MAC, and an I/O system to handle a local parallel memory address capability. The Ethernet link will be through the laser and PIN. The photocell sheet will be powered by the light from a power source 80 or the white light power system as described in U.S. patent application Ser. No. 11/647,652 and contemporaneously filed with this application. The photocell sheet is attached to the bottom of the FPGA 74 forming connections to the + and – of the FPGA 74. Since each photocell produces approximately 0.5 volts, the cells will be linked in series to produce 1.5 volts for the circuits in the FPGA 74.

The floating Faraday cage 76 will completely encompass the FPGA 74, photocell sheet, and the I/O for external drive.

Xilinx, Altera, and Actel are manufacturers of FPGAs, with Actel leading in radiation-hardened products. The triple redundancy allows for integrity by continually checking all three paths for matching information. If there is a difference, the two that match are considered having the correct information and operation continues (this is called a voting system). Once each FPGA 74 is certified, the circuit can be hardwired in an ASIC providing further integrity.

The system 50 is based on an FPGA 74 (Field Programmable Gate Array) that can be made into an ASIC (Application Specific Integrated Circuit) by the manufacturer. Once it is an ASIC, it can no longer be updated, hence the term "Hardwired". During the initial phases, the FPGA 74 is coded to respond to preferred protocol such as FireWire or IP. It is through this protocol that the FPGA 74 will communicate with its peers.

Each FPGA 74 will have hardwired state-machines that do the work of a processor. The state-machine operates on a series of operations at clock speed. A state-machine can do a function, branch to another state-machine, etc. For example:

1. State Machine Brake Control
2. Check brake feedback for entry—update console
3. Update counter
4. Check brake command entry—issue send update
5. Loop back to 1

All commands are similar to this scenario and step through the states as commanded. When a change in the memory area is logged in the check requester, the state-machines can detect by a single bit check if its area has been changed and request the update to be posted while resetting the register bit. This state-machine completes its cycle 7million times a second. Should it go a second without updating, an update will be forced. The second timeout is conditioned by the update counter overflow.

Also called "finite state machine," it is a computing device designed with the operational states required to solve a specific problem. The circuits are minimized, specialized and optimized for the application. For example, chips in audio, video and imaging controllers are often designed as state machines, because they can provide faster performance at lower cost than a general-purpose CPU. Automatic ticket dispensing machines are another example. There are countless special-purpose devices built as state machines.

In order to conserve memory space, the device can be keyed by its location to use only the memory locations allocated for this location and can be modified by an offset in the addressing register. For example, in FIG. 6, this location is actually starting at 1000, not 7000. But the system 50 thinks it is at 7000 because that is where the brake sensor 64 and control are located. The Loc key subtracts 6000 and therefore starts the real location at 1000.

Figure 6:
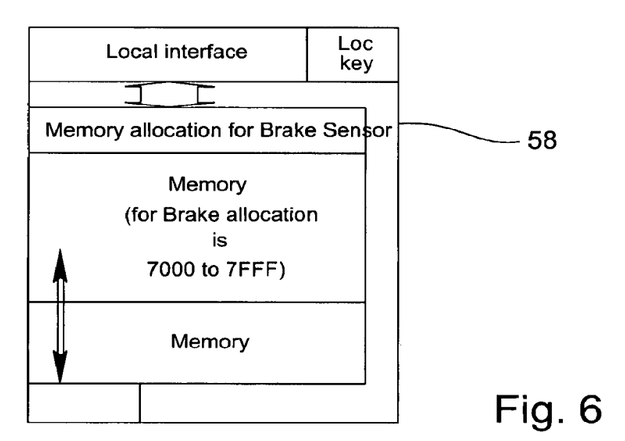
FIG. 6 is a block diagram of the hardwired interpreter for a brake.

This is only necessary if after all state-machines are allocated, there is not enough memory left to cover the need for all locations. The Loc key is needed to identify which state-machines to use as well as define the memory allocations.

The local interface mimics SRAM memory in that it has an address bus and a data path to read in and read out of memory. This is described in detail within the Memory Mimic application. The I/O to the local entity is as a memory device. All sensors 64 send information to the memory device, and the entity reads from the memory device to acquire instructions or commands. This information then gets shared with its peers that record the information for their local interface to use.

All references to the link for this document have been centered on the IP or FireWire as they are the current standard interfaces for higher speed interconnects. The protocol does not matter, this interface link could be any other protocol preferred by any vehicle manufacture.

FIG. 8 shows the inside of the Redundant(O) Box. It is not susceptible to lightning and EMI due to non-electrical connections between inside and outside the box.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A control system for a vehicle comprising:
a plurality of nodes disposed throughout the vehicle, each node performing a function and at least some of the plurality of nodes having a memory;
an optical network in communication with the nodes and through which the nodes communicate; and
at least one of the nodes having a hardwired interpreter that interprets the information transmitted from another one of the nodes via the optical network, the hardwired interpreter has no software so there is no instruction load time and no lookup time involved in the interpreter's operation and wherein at least some commands are reduced to a series of memory locations that are simultaneously updated throughout the vehicle.

2. A system as described in claim 1 wherein the hardwired interpreter includes a dedicated circuit within a chip.

3. A system as described in claim 2 wherein the hardwired interpreter includes a local link to another one of the nodes associated with the hardwired interpreter.

4. A system as described in claim 3 wherein the hardwired interpreter includes a link control in communication with the other nodes of the plurality of nodes.

5. A system as described in claim 4 wherein at least one of the other nodes is a sensor.

6. A system as described in claim 5 wherein the vehicle is either a car, truck, bus, plane, train or boat and may be manned or unmanned.

7. A control system for a vehicle comprising:
a brake pedal;
an optical sensor that determines where the pedal is positioned and produces a first optical signal regarding the position;
an optical network in communication with the sensor;
a hardwired interpreter in communication with the network to receive a first optical signal; and
a brake piston in communication with the network which receives a second optical signal produced by the hardwired interpreter and is actuated based on the second optical signal.

8. A control system for a plane comprising:
a yoke;
an optical sensor that determines where the yoke is positioned and produces a first optical signal regarding the position;
an optical network in communication with the sensor;
a hardwired interpreter in communication with the network to receive a first optical signal; and
an elevator in communication with the network which receives a second optical signal produced by the hardwired interpreter and is actuated based on the second optical signal.

9. A method for operating a vehicle comprising the steps of:
communicating information through an optical network between a plurality of nodes, at least one node of which has an optical sensor which monitors a mechanical function of the node and at least some of the nodes having a memory, disposed throughout the plane, each node performing a function; and
interpreting with at least one of the nodes having a hardwired interpreter the information transmitted from another one of the nodes via the optical network and wherein at least some commands are reduced to a series of memory locations that are simultaneously updated throughout the vehicle.

\* \* \* \* \*